United States Patent
Breda

(10) Patent No.: US 6,913,033 B2
(45) Date of Patent: Jul. 5, 2005

(54) DIVERTER VALVE WITH REMOVABLE CARTRIDGE INCLUDING INTEGRAL ATMOSPHERIC TYPE VACUUM BREAKER AND CHECK

(75) Inventor: Silvano Breda, 125 Limestone Crescent, Downsview, Ontario (CA), M3J 2R1

(73) Assignee: Silvano Breda, Toronto ( * ) Notice: Subject to any disclaimer, the term of this patent is extended or adjusted under 35 U.S.C. 154(b) by 0 days.

(21) Appl. No.: 10/405,363

(22) Filed: Apr. 3, 2003

(65) Prior Publication Data

US 2004/0194822 A1 Oct. 7, 2004

(51) Int. Cl.[7] ................................................ E03C 1/10
(52) U.S. Cl. ...................................................... 137/218
(58) Field of Search ......................................... 137/218

(56) References Cited

U.S. PATENT DOCUMENTS

| | | | |
|---|---|---|---|
| 2,303,037 A | 11/1942 | Fredrickson | |
| 3,162,210 A | 12/1964 | Bemis et al. | 137/218 |
| 3,955,598 A | * 5/1976 | Knapp | 137/625.17 |
| 4,589,438 A | 5/1986 | Breda | 137/218 |
| 5,685,330 A | 11/1997 | Breda | 137/218 |

* cited by examiner

Primary Examiner—Gerald A. Michalsky
(74) Attorney, Agent, or Firm—Neil H. Hughes; Ivor M. Hughes; Marcelo Sarkis

(57) ABSTRACT

A modular diverter valve with integral atmospheric type vacuum breaker has a housing and a replaceable rotatable cartridge is provided. The housing having a cartridge receiving chamber being surrounded by an internal housing wall. The housing also has an inlet port and laterally directed outlet ports. Each outlet port directs water for selective uses. The rotatable cartridge includes all working parts including a handle engaging portion, an inlet and an outlet for selective alignment with the housing ports. The cartridge has a hollow interior having an inlet tube in communication with the inlet of the cartridge and including a vented hollow space above the inlet tube, and including a float assembly to the vent the cartridge to the atmosphere. The float assembly has a resilient seal for sealing the open end of the inlet tube and a check valve to prevent siphoning to the inlet port.

7 Claims, 6 Drawing Sheets

US 6,913,033 B2

DIVERTER VALVE WITH REMOVABLE CARTRIDGE INCLUDING INTEGRAL ATMOSPHERIC TYPE VACUUM BREAKER AND CHECK

FIELD OF THE INVENTION

This invention relates to diverting valves and the simplification thereof.

BACKGROUND OF THE INVENTION

Vacuum breaker-a devices can be strategically located in the feed line of the water system, preventing the reverse flow of water by the admission of air, precluding any back siphonage which might occur, (See U.S. Pat. Nos. 2,303,037 and 3,162,210). Such devices are used in commercial and household installations, for example bidets, Roman Tubs, barber shop and hairdressing salon fixtures, laboratory sinks, to prevent the contamination of the potable water supply. Normally a separate backflow preventer would be installed in the line in advance of the components in the system for diverting the water for the different uses. For example, in a bidet, the water is diverted to the rim and the spray. In a bath tub the water is diverted to the spout, showerhead or removable handheld shower, and so on.

Applicant therefore provides herein improved backflow prevention in a compact, easily manufactured, replaceable cartridge valve assembly which simplifies those structures found in the prior art. The reader is referred to Applicant's prior U.S. Pat. Nos. 4,589,438 and 5,685,330 which clearly describes the operation of a vacuum breaker device in a diverting valve the teachings of which are herein incorporated by reference in this regard. However these prior developments are more costly to manufacture having more parts and lack simplicity of operation and replacement.

It is therefore an object of this invention, to provide a simplified diverter valve with integral atmospheric type vacuum breaker in an integral structure which is entirely reliable and easily serviced.

Further and other objects of the invention will become apparent to those skilled in the art from the following summary of the invention and more detailed description of preferred embodiments illustrated herein.

SUMMARY OF THE INVENTION

According to a primary aspect of the invention there is provided a diverter valve with integral atmospheric type vacuum breaker comprising a housing and a replaceable rotatable cartridge, said housing having a top and a bottom and a cartridge receiving chamber extending from proximate the top to proximate the bottom of said housing and being surrounded by an internal housing wall, said housing having an inlet port proximate the bottom thereof and a plurality of laterally directed outlet ports extending from the cartridge receiving chamber, each outlet port for directing water for selective alternative uses such as a removable spout, hand held showers, body spray or the like, said rotatable cartridge including all of the working parts of the valve including a handle engaging portion, an inlet in communication with the inlet port of the housing, and having an outlet for selective alignment with one of the housing ports and being rotatable from a position wherein water cannot enter the valve to a position in selective alignment with one of the outlet ports, said cartridge having a hollow interior and having contained therein an inlet tube in communication with the inlet of said cartridge and extending a predetermined distance from the cartridge inlet to an open end, said cartridge including within said hollow cartridge a vented hollow space above the terminus of said inlet tube, said hollow including a float assembly reciprocal therein from a position spaced from the open end of the inlet tube closing the vent of the cartridge to the atmosphere, to a position closing the inlet tube and venting the cartridge to atmosphere, the float assembly having a resilient washer (FIG. 2, #50a) for sealing the open end of the cartridge permitting venting of the valve to atmosphere, said float assembly also including a check valve to prevent siphoning of water outlet ports to the inlet port. In a preferred embodiment said housing includes a cut out portion proximate the top thereof extending about a predetermined extent of the housing for co-operation with a stop portion provided with the cartridge to limit the rotation of the cartridge between the selected positions. Preferably said housing includes a threaded portion proximate the top thereof for receiving a corresponding threaded rotatable nut for retaining the cartridge in place within said housing. Preferably said rotatable cartridge includes a cut-out portion carrying a substantially cylindrical seal grommet extending about the perimeter of said cartridge adjacent said outlet thereof for sealing engagement with the internal wall of said housing. Preferably said cylindrical seal is manufactured from, special engineered plastic. Preferably the skirt of said float extends over the open end of the inlet tube to deflect the incoming water downwardly and to close and seal the tube to prevent the backflow of water from entering said diverter valve. Preferably said tube carries a cup seal extending downwardly over the tube intermediate its ends to farther seal the tube inlet preventing backflow of water.

In one embodiment said housing may include a threaded portion proximate the top thereof for receiving a corresponding threaded supplementary preferably press fit flush plug held down by nut cap 25 for sealing the cartridge receiving chamber of the said housing when the supply lines are being flushed and the cartridge is not installed to avoid build up of sediment therein during a flushing process.

According to another aspect of the invention there is provided a housing comprising a cartridge receiving chamber for a cartridge for a cartridge valve assembly, said housing including a threaded portion proximate the top thereof for receiving a corresponding threaded supplementary preferably press fit flush plug held down by nut cap 25 for sealing the cartridge receiving chamber of the valve when the supply lines are being flushed and the cartridge is not installed to avoid build up of sediment therein during a flushing process.

According to another aspect of the invention there is provided a method of flushing a plurality of interconnected valves in a high rise each valve housing comprising a cartridge receiving chamber for a cartridge for a cartridge valve assembly, said housing including a threaded portion proximate the top thereof for receiving a corresponding threaded supplementary preferably press fit flush plug held down by nut cap 25 for sealing the cartridge receiving chamber of the valve when the supply lines are being flushed and the cartridge is not installed to avoid build up of sediment therein during a flushing process;

said method comprising subsequent to installing said plurality of valves but prior to installing said cartridges;

placing said supplementary preferably press fit flush plug held down by nut cap 25 over each of said housings to seal said water flow within said valve;

cleaning out sediment and other undesirable particulate that would other wise enter the valve cartridge and render it inoperable;

let the water flow for a predetermined length of time;

shutting of the water;

removing the supplementary flush plugs;

permanently installing the cartridge; and completing the installation;

wherein sediment and unwanted materials are prevented from contaminating the cartridges.

DESCRIPTION OF THE DRAWINGS

The invention will now be illustrated with reference to drawings of embodiments of the invention.

DETAILED DESCRIPTION OF EMBODIMENTS OF THE INVENTION

Figure 2:
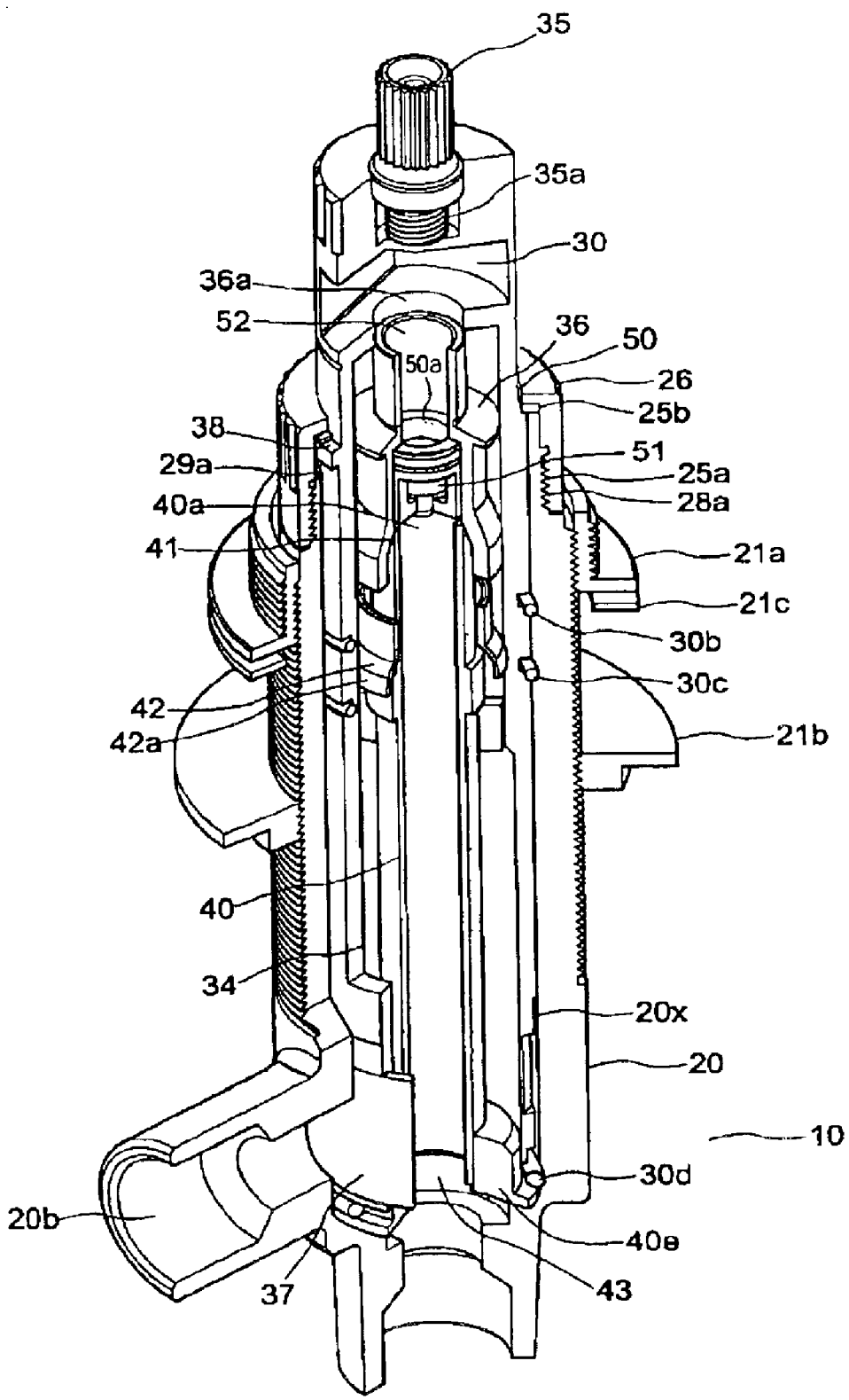
FIG. 2 is a view similar to that of FIG. 1 but shown in cut away perspective.
Figure 3:
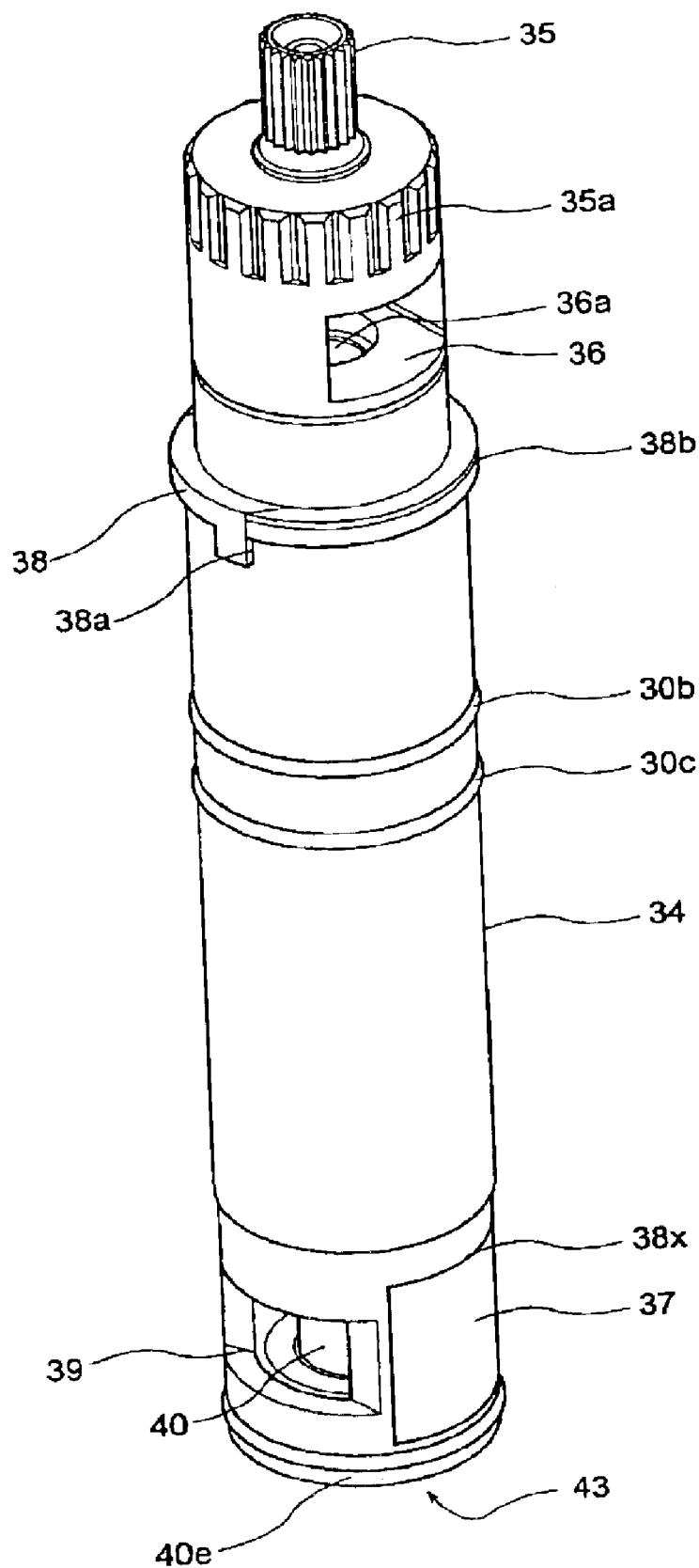
FIG. 3 is a perspective view of the cartridge included with the diverting valve illustrated in a preferred embodiment of the invention.
Figure 4:
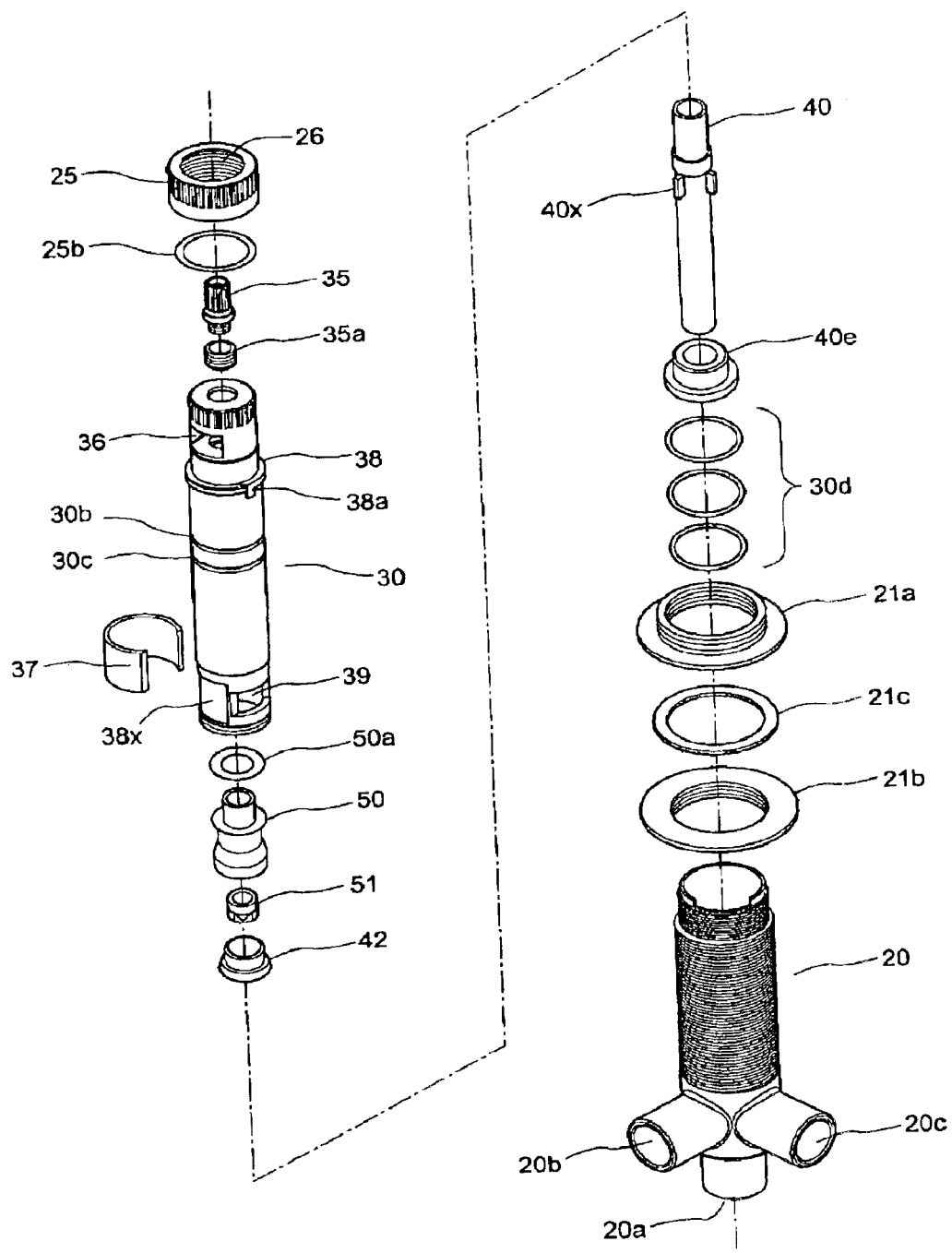
FIGS. 4 is an exploded perspective view of the diverter valve of FIG. 1 illustrating the various components thereof.

Referring to the figures there is illustrated a diverting valve assembly (10) which includes a housing (20) and a removable rotary cartridge (30) contained within the housing (20). The rotary cartridge (30) includes a banded portion (not shown) which engages with the spline (35) provided for the handle and with the various serrations (30A) provided with the cartridge (30). The spine portion (35) as best seen in FIG. 2 includes a spline insert (35A) which retains the brass spline (35) within the substantially plastic cartridge top adjacent (30A). Any handle portion suitably designed to compliment the physical structure of the top of the cartridge (30) may be used as desired by the purchaser. The modular valve (10) therefore may be used for a shower assembly or alternatively for a whirlpool or a soaker tub. The cartridge (30) is removable and simple in construction. The entire assembly is corrosion resistant being made from engineered plastics and brass. The closure (25) includes an opening (26) through which the top portion of cartridge (30) extends. The top portion includes a venting port (36) open to atmosphere so that the top of the diverting valve as best seen in FIG. 2 includes a venting port (36A) within the cartridge (30) extending into the window (36) to allow the cartridge to be vented to atmosphere when water does not flow through the diverting valve. Of course the diverting valve (10) is mounted in position and retained on for example a roman tub deck via collar nuts (21A and 21B) which may be received on the threading portion (21) on the parameter of the body (20). A deck seal (21C) is also provided. The body (20) also includes a water inlet port (20A) proximate the bottom thereof and a water outlet ports (20B and 20C). When the cartridge (30) therefore is rotated to align the outlet port (39) thereof with one of the selected outlets (20B or 20C) of the body, water will flow from a supply valve in mixed form into inlet (20A) extending up into the supply tube (40) within the diverting valve and water will overflow the inlet tube (40) and extend down into the space disposed between the inlet tube (40) and the inner wall of the outer cartridge cylindrically shaped body (34) and travel within the space between the outer wall of the tube (40) and the inner wall of the body (34) and exit the outlet (39) of the cartridge tube to the desired outlet port. The tube (40) includes a inlet (43) as best seen in FIG. 2 to except water from the inlet to the valve (20A) from the supply source. As the water rises through the tube the float (50) moves upward to its further extremity to block port (36A) from atmosphere and therefore prevent air from entering the valve when water is being supplied to the desired outlet, for example a shower, or a filling spout to a soaker tub. The float assembly (50) also includes a check portion (51) contained within an opening of the float assembly which prevents water from flowing back into the inlet port (40A) of the supply tube (40) when water is not being diverted to any particular outlet. When the water supply is therefore shut off the diverter valve float (50) will extend over the top (41) of the inlet tube (40) but will allow air to enter through the top of the cartridge via a vent (36 and 36A) to therefore vent the entire diverting valve to atmosphere and prevent any siphoning action that might occur had the vent not been provided. A second seal (42) including a downwardly depending skirt (42A) is provided and carried on the supply tube (40) as best seen in FIG. 4 wherein the seal (42) is retained in position on the supply tube (40) at position (40X). The bottom of supply tube (40) includes a bushing portion (40E) as best seen in FIG. 4 to seal the supply tube inlet at (43) against the water path between the perimeter of the supply tube and the interior of the cartridges (34). The appropriate seals are provided throughout the entire diverting valve assembly at nylon washer (25B), O-rings (30B and 30C) on the perimeter of the cartridge (40), seal (50A) for the float (50, O-rings (30D) as best seen in FIG. 4 for the bottom of the cartridge assembly. These are typical and do not constitute part of the invention. The top portion of the cartridge (30) as best seen in FIG. 3 includes a collar (38B) having a metal stop portion made of brass (38) and including a stop shoulder (38A) which will engage the stop portion on the cooperative rim (29A) of body (20) located just above the threaded portions (25A) for securing the nut (25) having an interior that is also cooperatively threaded. The stops therefore which are not shown are disposed on cut outs on the rim portion (29A) to limit the rotation of the cartridge to and from both outlets (20A and 20C) and no further.

Figure 1:
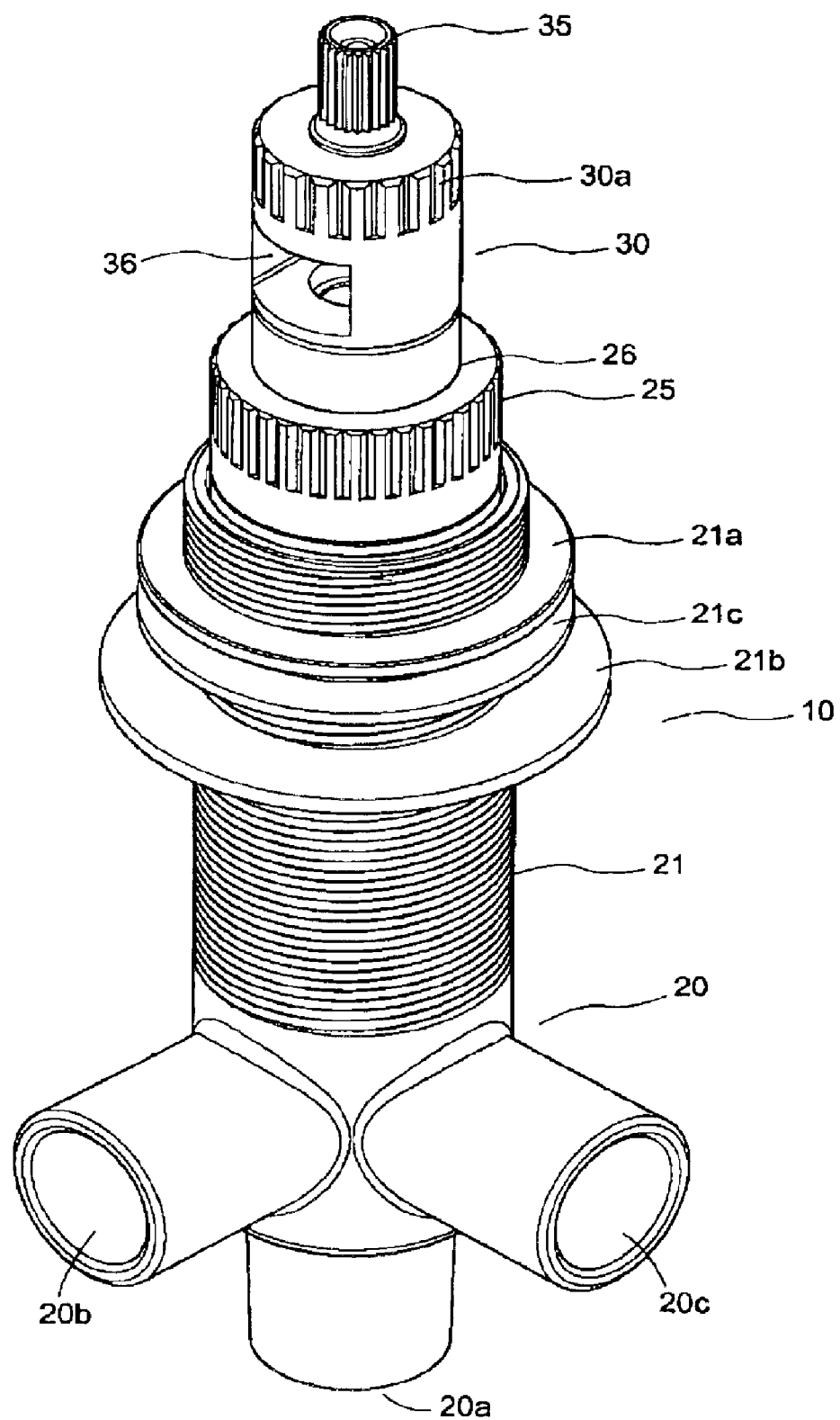
FIG. 1 is an assembled perspective view of the diverter valve illustrated in the preferred embodiment of the invention.

Once the housing (20) of the diverting valve (10) is installed in the appropriate location, and for example a shower stall (not shown) and engaged with the supply valve as best seen in Applicant's prior disclosures which were incorporated by reference and the reader is referred to FIG. 1 therein, the housing therefore includes an inner chamber (20X) within which the cartridge is placed. It is important that the stops (38A) be aligned with the edges (29A) of the rim portion as best seen in FIG. 2 to allow for the limiting of the rotation of the cartridge (30) when in the housing (20). Once the cartridge (30) is inserted into the housing (20) the nut (25) is installed over the top wherein the cartridge extends through the opening (26) within nut (25) which is threadidly received on the threaded portion (28A) of the housing (20) wherein mating threadings (25A and 28A) cooperate to hold the cartridge in position. A desired handle is inserted on the spline (35) (not shown). A grommet (37) is included with the cartridge as best seen in FIG. 3 retained within compatible shapes cylindrical pocket (38X) so that the seal (37) may engage the inner wall of housing (20) when the outlet (39) of the cartridge is selectively aligned with either port (20B or 20C). The seal therefore extends about substantial amount of the perimeter of the cartridge

(30) at the bottom thereof with the exception of the outlet port area (39) in this way water may not enter the valve and be transferred to both outlet ports at the same time.

The diverting valve of the present invention therefore provides multiple checks at float (51) and the seal (42) (check umbrella) which improves the reliability and safety of the valve in relation to preventing siphoning of water from the outlets (20B or 20C) as in the case of a soaker tub and the contamination of potable water. The operation of the venting aspect of the valve is clearly described in Applicant's prior patents. The reader is referred thereto.

Figure 5:
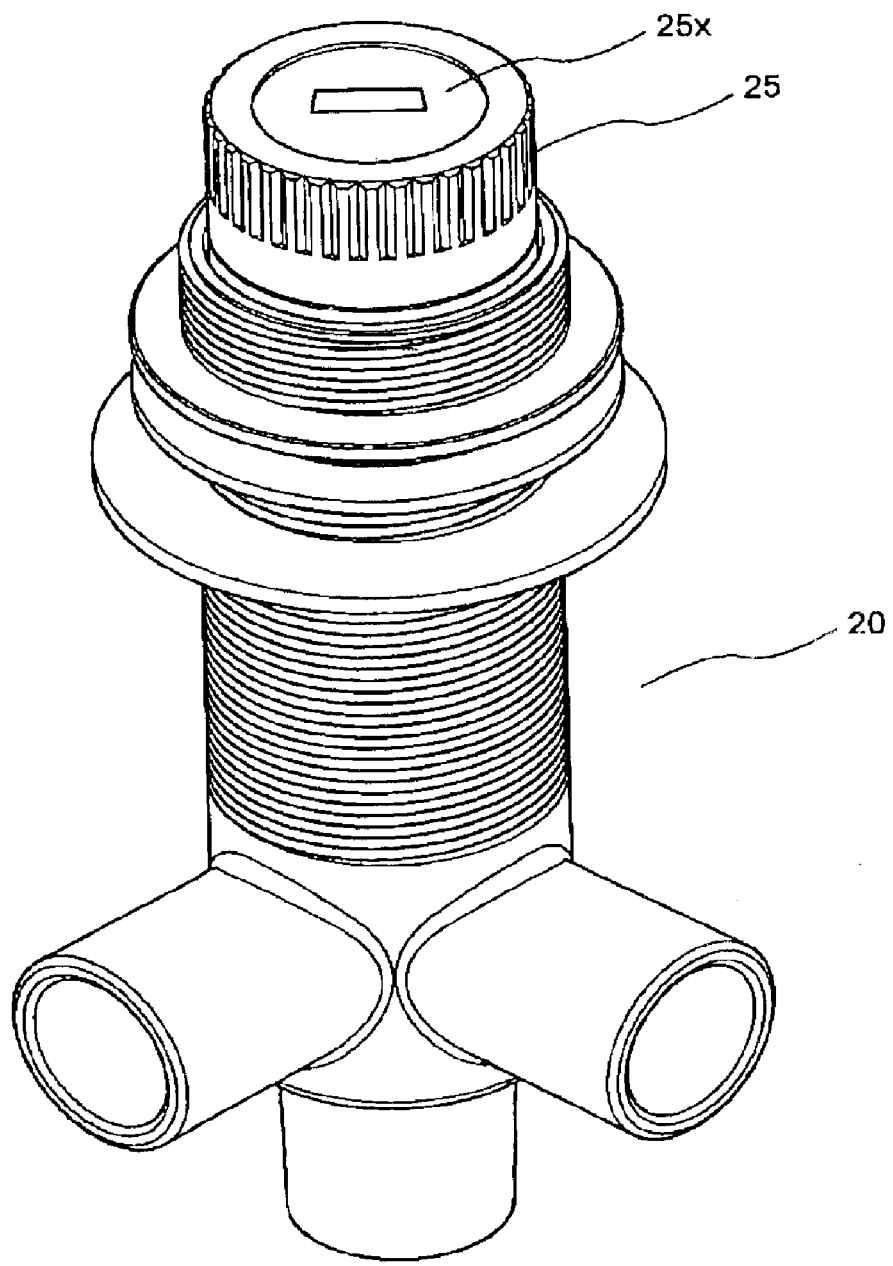
FIGS. 5, 5A and 5B illustrate alternative embodiments of the invention showing the housing of FIG. 1 having a supplementary cap disposed therewith.
Figure 5A:
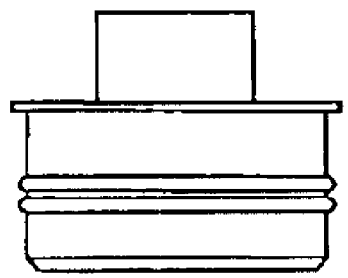
Figure 5B:
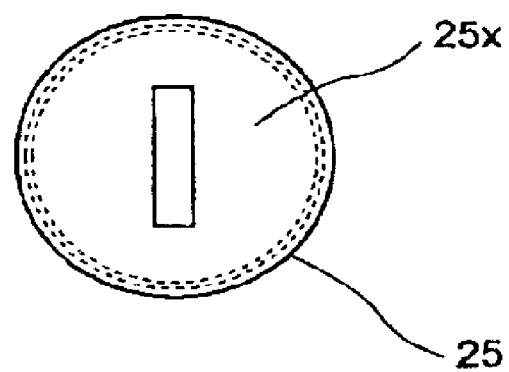

In an alternative embodiment and particularly when a diverting valve is utilized in a high rise for a multiplicity of shower installations, it has been found that particularly for new buildings that the entire plumbing system must be flushed for a predetermined amount of time to flush out all sediment resulting from the installation. In the past, utilizing the prior art constructions the cartridges and valve assemblies would be contaminated with this sediment being flushed. The present structure contemplates as best seen in FIGS. 5 and 5A providing a supplementary press fit plug (25X) retained by the normal cap (25) but which totally closes off the diverter valve and allows for the flushing thereof without having to insert the cartridge and result in damaging the cartridge by the collection of sediment therein. This supplementary plug may be designed to be incorporated with any cartridge system and any cartridge valve having little or no limitation. It is shown here embodied with the housing of the diverting valve for simplicity purposes but it is not intended to be limiting to only diverter valves.

In one embodiment said housing may include a threaded portion proximate the top thereof for receiving a corresponding threaded supplementary plug for sealing the cartridge receiving chamber of the diverting valve when the supply lines are being flushed and the cartridge is not installed to avoid build up of sediment therein during a flushing process.

According to another aspect of the invention there is provided a housing comprising a cartridge receiving chamber for a cartridge for a cartridge valve assembly, said housing including a threaded portion proximate the top thereof for receiving a corresponding threaded supplementary rotatable cap for sealing the cartridge receiving chamber of the valve when the supply lines are being flushed and the cartridge is not installed to avoid build up of sediment therein during a flushing process.

The method therefore of flushing the plumbing system is clearly set out in the summary of the invention and repeated here.

According to another aspect of the invention there is provided a method of flushing a plurality of interconnected valves in a high rise each valve housing comprising a cartridge receiving chamber for a cartridge for a cartridge valve assembly, said housing including a threaded portion proximate the top thereof for receiving a corresponding supplementary plug for sealing the cartridge receiving chamber of the valve when the supply lines are being flushed and the cartridge is not installed to avoid build up of sediment therein during a flushing process;

said method comprising subsequent to installing said plurality of valves but prior to installing said cartridges;

placing said supplementary plug over each of said housings to seal said water flow within said valve;

placing an inline filter in the supply lines and outlet lines;

filtering out sediment and other undesirable particulate that would other wise enter the valve cartridge;

let the water flow for a predetermined length of time;

shutting of the water;

removing the supplementary plugs;

permanently installing the cartridge; and completing the installation;

wherein sediment and unwanted materials are prevented from contaminating the cartridges.

A reliable simple diverting valve therefore is provided which meets the objectives of the invention as set out above and overcomes the limitations in the prior art.

As many changes can be made to the embodiments of the invention without departing from the scope of the invention; it is intended that all matter contained herein be interpreted as illustrative of the invention and not in a limiting sense.

What is claimed is:

1. A diverter valve with integral atmospheric type vacuum breaker comprising a housing and a replaceable rotatable cartridge, said housing having a top and a bottom and a cartridge receiving chamber extending from proximate the top to proximate the bottom of said housing and being surrounded by an internal housing wall, said housing having an inlet port proximate the bottom thereof and a plurality of laterally directed outlet ports extending from the cartridge receiving chamber, each outlet port for directing water for selective alternative uses such as a spout, shower, body spray or the like, said rotatable cartridge including all of the working parts of the valve including a handle engaging portion, an inlet in communication with the inlet port of the housing, and having an outlet for selective alignment with one of the housing ports and being rotatable from a position wherein water cannot enter the valve to a position in selective alignment with one of the outlet ports, said cartridge having a hollow interior and having contained therein an inlet tube in communication with the inlet of said cartridge and extending a predetermined distance from the cartridge inlet to an open end, said cartridge including within said hollow cartridge a vented hollow space above the terminus of said inlet tube, said hollow including a float assembly reciprocal therein from a position spaced from the open end of the inlet tube closing the vent of the cartridge to the atmosphere, to a position closing the inlet tube and venting the cartridge to atmosphere, the float assembly having a resilient seal for sealing the open end of the inlet tube and permitting venting of the valve to atmosphere, said float assembly also including a check valve to prevent siphoning of water outlet ports to the inlet port, wherein said rotatable cartridge includes a cut-out portion carrying a substantially cylindrical seal extending about the perimeter of said cartridge adjacent said outlet thereof for sealing engagement with the internal wall of said housing.

2. The diverter valve of claim 1, wherein said housing includes a cut out portion proximate the top thereof extending about a predetermined extent of the housing for co-operation with a stop portion provided with the cartridge to limit the rotation of the cartridge between the selected positions.

3. The diverter valve of claim 1 or 2, wherein said housing includes a threaded portion proximate the top thereof for receiving a corresponding threaded rotatable cap for retaining the cartridge in place within said housing.

4. The diverter valve of claim 1 or 2, wherein said housing includes a threaded portion proximate the top thereof for receiving a corresponding threaded rotatable cap for sealing the cartridge receiving chamber of the diverting valve when the supply lines are being flushed and the cartridge is not installed to avoid build up of sediment therein during the flushing process.

5. The diverter valve of claim 1 or 2, wherein said float further comprises a skirt extending downwardly over the open end of the tube to close and seal the tube when water is prevented from entering said diverter valve.

6. The diverter valve of claim 1 or 2, wherein said tube carries a cup seal extending downwardly over the tube intermediate its ends to further seal the tube inlet preventing backflow of water.

7. The diverter valve of claim 1, wherein said cylindrical seal is manufactured from engineered plastic.

* * * * *